US006368657B1

(12) United States Patent
Lee

(10) Patent No.: US 6,368,657 B1
(45) Date of Patent: Apr. 9, 2002

(54) PRECIPITATION RECOVERY PROCESS FOR FOOD WASTE SLUDGE

(75) Inventor: John H. Lee, Olathe, KS (US)

(73) Assignee: Rigel Technology Corporation, Olathe, KS (US)

( * ) Notice: Subject to any disclaimer, the term of this patent is extended or adjusted under 35 U.S.C. 154(b) by 0 days.

(21) Appl. No.: 09/920,125

(22) Filed: Aug. 1, 2001

(51) Int. Cl.⁷ .................................................. A23K 1/04
(52) U.S. Cl. ....................... 426/658; 426/647; 426/654; 426/807; 71/17; 71/25; 71/26
(58) Field of Search ................. 426/647, 658, 426/654, 807; 71/17, 25, 26

(56) References Cited

U.S. PATENT DOCUMENTS

| | | | |
|---|---|---|---|
| 3,390,999 A | * 7/1968 | Jantzen | 99/2 |
| 3,622,510 A | * 11/1971 | Felicetta | 210/54 |
| 3,936,375 A | * 2/1976 | Nettli | 210/45 |
| 3,961,081 A | 6/1976 | McKenzie | 426/658 |
| 4,169,162 A | * 9/1979 | Appleman | 426/335 |
| 4,731,249 A | 3/1988 | Findley | 426/69 |
| 4,767,537 A | 8/1988 | Davis | 210/608 |
| 5,514,388 A | 5/1996 | Rohwer | 426/231 |
| D375,181 S | 11/1996 | Tourney et al. | D1/100 |
| 5,595,717 A | 1/1997 | Harper et al. | 423/339 |
| 5,622,739 A | 4/1997 | Benton et al. | 426/74 |
| 5,755,178 A | 5/1998 | Lush | 119/51.03 |
| 6,143,333 A | 11/2000 | Lanter | 426/1 |
| 6,168,803 B1 | 1/2001 | Harris et al. | 424/442 |
| D440,362 S | 4/2001 | Thornberg | D30/130 |
| 6,235,339 B1 | 5/2001 | Harmom et al. | 426/646 |

FOREIGN PATENT DOCUMENTS

| | | | |
|---|---|---|---|
| DE | 1692544 | * | 8/1974 |
| GB | 2222065 | * | 2/1990 |
| JP | 54026961 | * | 2/1979 |
| JP | 61108000 | * | 5/1985 |

OTHER PUBLICATIONS

C. L. Hansen, E. L. Field and R. C. Huff, Energy Conservation in Small Meat, Poultry and Dairy Processing Plants. Paper 83–6002, American Society of Agricultural Engineers, St. Joseph, Michigan, 1983.

H. W. Ockerman and C. L. Hansen, "Animal By–Product Processing & Utilization", Technomic Publishing Company, Inc., 2000, pp. 457–509.

* cited by examiner

Primary Examiner—Chhaya D. Sayala

(57) ABSTRACT

A practical precipitation recovery process for food waste sludge from dissolved air floatation (DAF) units and sugar by products is provided. Typical meat DAF (dissolved air floatation) skimming sludge has about 12% solid with about 40% fat and 42% protein in solid basis. The skimming sludge is often for land application to cause a pollution problem. Much of the potential nutritive value of the skimming is lost through microbiological degradation. The process converts the skimming sludge and animal blood into a precipitate, which binds most nutrients. Then the precipitate product can be separated easily by a centrifuge, screen or press process. The dry process cost can be reduced because the extra water is removed and the product surface area is increased. The process can convert the waste skimming sludge into a value added product as a good and safe ingredient for feed and nutritional applications. A typical dry product has about protein 54%, pepsin digestible protein 96%, fat 23%, ash 8.5%, moisture 6%, very low levels of aerobic plate count, total coliforms, staphylococcus aureus, yeast and mold, undetected *E. coli* and negative salmonella. This process can also be used to improve the properties of animal feed block products. If the precipitation process can be scaled up into commercialization production, the process could save and create millions of dollars for food and feed industries every year.

9 Claims, No Drawings

PRECIPITATION RECOVERY PROCESS FOR FOOD WASTE SLUDGE

FIELD OF THE INVENTION

The present invention relates to process methods of treating food waste sludge, and more particularly to a process method of converting the DAF (dissolved air floatation) skimming sludge of a food processing plant into a value added product with good nutritional value for feed and fertilizer nutritional applications and precipitating molasses sludge from a sugar processing plant into a product with much more hardness and less moisture absorption.

BACKGROUND OF THE INVENTION

The waste water from a food processing plant has high BOD (biochemical oxygen demand), FOG (fats, oils and grease), SS (suspended solids) and TKN (total Kjeldahl nitrogen). Dissolved air floatation (DAF) units are used in meat, milk product, snack food processing and waste water treatment plants. The primary purpose is to reduce BOD, SS, FOG and TKN in the waste water passing to sewage. But it creates another problem to dispose of the pasty and oily skimming sludge, which is separated into the top portion because of the low density. The waste skimming sludge has very attractive nutrients—protein, fat, carbohydrate and minerals.

Animal meat industry is a major industry to use dissolved air floatation (DAF) units to reduce BOD, SS, FOG and TKN in the waste water passing to sewage. Animals are grown and slaughtered to meet people's needs every year, which includes beefs, pigs, chickens, turkeys and others. In the animal processing industry, an average of 4.5 kg of protein is lost to the sewer for every 454 kg of live weight kill (Ockerman and Hansen, 2000). The percentage is about 1%. If half of the protein now lost to the sewer were recovered, there would be at least an additional 181 million kg of protein each year, worth perhaps $ 400 million from animal processing in the United States (Hansen, 1983). It is very important to use animal wastes and by products for economic and public health achievements.

The skimming sludge from a meat processing plants has about 12% solid with about 40–45% fat and 45–40% protein in solid basis. The solid level can be increased by a dewatering equipment. But it is not easy process. U.S. Pat. No. 4,767,537 discloses a dewatering process for increasing the solid content of sludge with a digester and nitrate ions.

There are four methods to deal with the skimming sludge. The common method is for land application, which causes a pollution problem. The fee for a mid-size animal processing plant with 13 truck loads of the skimming sludge per week is about $150,000 per year for the land application. Also the potential nutritive value of the skimming sludge is lost through microbiological degradation. Another method is to use microorganisms for anaerobic or aerobic lagoon treatment to break down the organic matters. The additional cost and equipment are involved in the treatments. Land application and lagoon systems on large-scale farms can pollute water sources and should not be used. But there are no other feasible and affordable methods. The third method is to heat the skimming sludge and to centrifuge it into fat, solution and solid layers. But the separation is not good. There also are mixtures between fat and solution layers and between solid and solution layers. Then the three major products are processed and used separately. The additional equipment is involved. The fourth method is to blend the skimming sludge with other by products. But the blended product price is decreased significantly. For example turkey meal price is about $300 per ton without turkey DAF skimming sludge or $225 per ton with turkey DAF skimming sludge. The difference is $75 per ton. Also the dry process cost is high because the skimming sludge has about 88% moisture. All four methods are not economic methods. These methods have been discussed in the book "Animal By-Product Processing & Utilization" (Ockerman and Hansen, 2000). U.S. Pat. No. 6,235,339 discloses a process method to treat a meat processing waste stream with different chemicals. U.S. Pat. No. 5,514,388 discloses a process to treat a protein with a base to increase the pH to a strong basic endpoint at first. Then fat is added into the alkali protein. The protein gel is formed when the pH is lowed to an acidic endpoint with an acid. U.S. Pat. No. 5,595,717 discloses a process to cause additional quantities of silica to precipitate out of the geothermal water as particles. These particles have high surface area for improving energy recovery. This U.S. patent relates to silica precipitation, which does not relate to food DAF skimming sludge. If the DAF skimming sludge can be converted into a nice precipitate at low process cost, the nutrients can be recovered and converted into good nutritional products easily. Also the dry process cost can be reduced because the extra water can be removed and the precipitate particles have high surface area. There is a need for an inexpensive process, which can convert food DAF skimming sludge into a value added product.

It has been found DAF skimming sludge with low density, which floats on the top portion, can be precipitated and separated from the solution after precipitating with animal blood under a heat treatment. The precipitate can bind most nutrients together. Some food or feed grade chemicals such as phosphate acid, phosphate salt, calcium, ethylenediaminetetraacetic acid, ethylenediaminetetraacetic salt, polyphosphate, sorbic acid, sorbate salt, bisulfite salt and antioxidants can be used to help the process and product. After forming the binding precipitate, the density of the product with the skimming sludge is increased significantly. So the product can sink and precipitate from the top portion to the bottom portion with high recovery yield for these nutrients after a centrifuge process. For example 95% of the protein can be recovered. The separation is very good. The extra water can be removed by a centrifugation, screen, decant or press process to increase the solid level and to reduce the dry process cost. The process and product can limit the problems of waste pollution and high dry process cost. The two raw materials of DAF skimming sludge and animal blood can be easily mixed in an animal slaughter plant and processed by a heat treatment. The product has low bacterial accounts. The products may have by pass function for ruminant animals for more milk production. The skimming sludge, which is often for land application with a fee, can become value added nutritional ingredients for feed and other nutritional applications. The value of the final dry product from the typical mid-size animal processing plant is more than $1,200,000 per year.

The purpose of the present invention is to provide a practical precipitation process for binding most nutrients together, converting the food waste sludge into value added products, recovering more materials, reducing dry process cost, increasing product value and reducing waste pollution problem.

Molasses is a sugar liquid waste by product from a sugar processing plant. Lactose is another sugar liquid waste by product from a cheese or whey protein processing plant. These carbohydrate sugars are often concentrated into a viscous sludge at solid from 40–75% for delivering to customers. The sugars become very viscous when the moisture becomes less and less. The viscosity can be reduced with a heat treatment. The sugar by products are used as liquid sludge for feed applications because the dry process is an expensive process. Molasses is often used to make block products as self feed supplement applications for beefs and cows, which are described by U.S. Pat. Nos. 6,168,803, D440,362, 5,755,178, 5,622,739, D375,181, 4,731,249 and 3,961,081. Dehydrated nutrients such as proteins, minerals and vitamins are mixed with the molasses after molasses is heated and vacuumed to low moisture level such as 5%. But the block products become soft easily because it can absorb moisture from air easily. Various attempts have been made to improve the properties of animal block feed products such as hardness, moisture absorption, foam and storage life over the years. U.S. Pat. No. 6,168,803 discloses to use at least alkaline earth metal oxide to improve the block feed product. U.S. Pat. No. 6,143,333 discloses to use magnesium oxide for fish attractant block. U.S. Pat. No. 4,731,249 discloses to use the polymer of polyvinyl alcohol for solidifying the block feed product. The process of the present invention is to use animal blood proteins to improve the block properties such as less form, more hardness, less moisture absorption and longer storage life. This process may have more nutritional benefits and lower process cost over other methods. It has been found that animal blood at low percentage rate such as 3–10% in solid basis can increase the block hardness and reduce moisture absorption significantly. The new block feed products may have longer shelf life because of more hardness and less moisture absorption. This process may help feed companies to produce better molasses block feed products for providing the products to dairy and beef farmers. Besides the block products, it also has been found that this precipitation process with high animal blood percentage rate such as more than 15% in solid basis can precipitate the sugar by products into solid particles to reduce the dry process cost significantly, which could save the industry millions of dollars. The dry products can be used for different applications easily.

SUMMARY OF THE INVENTION

The present invention provides a simple and practical process to form a precipitate for converting DAF (dissolved air floatation) skimming sludge into a value-added product and reducing dry process cost and improving molasses products with more hardness and less moisture absorption.

The final DAF skimming product has good nutritional value and low bacterial counts, which can be used as a good and safe ingredient for nutritional applications. The process could save millions dollars for food industry every year.

DAF skimming sludge can be mixed with animal blood easily. Direct or indirect heat is applied to form a precipitate for binding most nutrients together when the temperature is above 70° C.

The pH value of the mixtures can be adjusted for stronger precipitation. A centrifugation, screen of press process is applied to remove the extra water. A general dry process may be used to dry the product. Some food or feed grade chemicals can be used for the process and product. If a wet product is used for making a product with other ingredients, a dry process is not necessary.

Dry process cost can be reduced because the water in the precipitate can be removed by a centrifugation, screen, decant or press process and the precipitate has more surface area comparing to the raw materials. The final product has low bacterial counts such as *E. coli,* salmonella, total coliforms, yeast, mold and staphylococcus. Also this process limit the waste pollution problem from land application and lagoon treatments.

The present invention also provides the same simple and practical process to form a precipitate for improving molasses block products with more hardness, less moisture absorption and longer shelf life. Also the sugar by products can be dried into solid particles at low dry process cost by this precipitation recovery process.

DETAIL DESCRIPTION OF THE PREFERRED EMBODIMENTS

The following examples set forth preferred methods in accordance with the invention. It is to be understood, however, that these examples are provided by way of illustration and nothing therein should be taken as a limitation upon the overall scope of the invention.

EXAMPLE 1
(Turkey DAF Skimming and Turkey Blood)

100 grams of turkey DAF skimming sludge was mixed with 100 grams of turkey blood and 0.08 grams of Rigel 1015. Then the mixture was mixed and heated to 95° C. The formed precipitate was collected by a centrifugation process at 2250 rpm for 4 minutes. The protein recovery was 95.9%. The clear solution with light yellowish color was discarded. The precipitate was dried in an oven at 100° C. for 3 hours. The product was particles. The analytical data were follows: protein (51.5%), fat (24.1%) and moisture (6.7%).

EXAMPLE 2
(Pork DAF Skimming and Pork Blood)

200 grams of pork DAF skimming sludge was mixed with 85 grams of pork blood and 0.06 grams of Rigel 1015. Then the mixture was mixed and heated to 93° C. The formed precipitate was collected by a centrifugation process at 2250 rpm for 5 minutes. The protein recovery was 98.8%. The yellowish solution was discarded. The precipitate was dried in an oven at 100° C. for 2.5 hours. The product was particles. The analytical data were follows: protein (57.4%), fat (23.1%), ash (3.9%) and moisture (2.7%).

EXAMPLE 3
(Turkey DAF Skimming and Red Blood Cells)

100 grams of turkey DAF skimming sludge was mixed with 60 grams of beef red blood cells and 0.05 grams of Rigel 1015. Then the mixture was mixed and heated to 93° C. The formed precipitate was collected by a screen (100 mesh). The precipitate was dried under a summer sunlight for 5 hours. The product is particles. The analytical data were follows: protein (59.5%), fat (20.6%), ash (5.8%) and moisture (4.5%).

EXAMPLE 4
(Molasses and Beef Red Blood Cells)

80 grams of molasses sludge was mixed with 120 grams of beef red blood cells. The solid rate for molasses and beef red blood cells was 60% against 40%. Then the mixture was mixed and heated to 85° C. The formed precipitate was dried in an oven at 100° C. for 2 hours. The product was easily broken into particles. The analytical data were follows: protein (41.8%), fat (1.6%), ash (8.5%) and moisture (4.9%).

EXAMPLE 5
(Sugar and Pork Whole Blood)

100 grams of molasses sludge was mixed with 200 grams of beef red blood cells. The solid rate for molasses and beef red blood cells was 60% against 40%. Then the mixture was mixed, heated and vacuumed at 98° C. The formed precipitate was dried in an oven at 100° C. for 2 hours. The product was easily broken into particles. The analytical data were follows: protein (40.5%), fat (1.2%), ash (9.5%) and moisture (5.1%).

EXAMPLE 6
(Molasses and Pork Red Blood Cells)

180 grams of molasses sludge was mixed with 20 grams of pork red blood cells. The solid rate for molasses and pork red blood cells was 95.6% against 4.4%. Then the mixture was mixed and heated to 87° C. Then the product was in an oven at 100° C. for overnight to form a hard block. Molasses block without pork red blood cells was also made in the same method. The block made from the molasses and pork red blood cells had much more hardness and less moisture absorption comparing with molasses block without pork red blood cells.

EXAMPLE 7
(Chicken DAF Skimming Sludge and Chicken Blood)

600 grams of chicken DAF skimming was mixed with 250 grams of chicken blood and 2 grams of Rigel 1008. Then mixture was mixed and heated to 93° C. The mixture was screened by a #100 mesh screen. The precipitate was dried in an oven at 105° C. for 2.5 hours. The product was a small particle form without any oily feeling. The analytical data were follows:

TABLE 1

Nutritional and Microorganism Analysis

| | |
|---|---|
| Protein: | 54.6% |
| Pepsin Digestible Protein: | 95.9% |
| Fat: | 23.7% |
| Ash: | 8.5% |
| Moisture: | 6.3% |
| Aerobic plate count: | 70 cfu/g |
| E. Coli: | Not Detected |

TABLE 1-continued

Nutritional and Microorganism Analysis

| | |
|---|---|
| Total coliforms: | Not Detected |
| Staphylococcus aureus: | Not Detected |
| Salmonella: | Negative org/25 g |
| Yeast: | 10 cfu/g |
| Mold: | Not Detected |

What is claimed is:

1. A method of converting the sludge of a food processing plant to obtain a nutritional product comprising: skimming sludge from dissolved air flotation units, mixing the skimmed sludge with liquid animal blood and heating the mixture to a temperature above 70° C. to form the product.

2. The method of claim 1 wherein the liquid animal blood is a cross-linking agent selected from the group consisting of animal whole blood, red blood cells and plasma.

3. The method of claim 1 further comprising maintaining the pH of the mixture to between 5 and 9 for the cross-linking interaction between the skimmed sludge and the animal blood.

4. The method of claim 1 further comprising adding to the mixture one or more of the following substances selected from the group consisting of ethylenediaminetetraacetic acid salt, sorbic acid, calcium, antioxidants, bisulfate, polyphosphate and phosphate salts in an amount less than 0.3% (w/w).

5. The method of claim 1 wherein the product is dry or wet.

6. A method of producing an animal feed block comprising mixing molasses sludge obtained from a sugar processing plant with animal blood in liquid form which acts as a cross-linking agent, then heating to a temperature above 70° C. and vacuum drying to form a block.

7. An animal feed block produced according to the method of claim 6.

8. A method of producing an animal feed comprising mixing molasses sludge obtained from a sugar processing plant with animal blood in liquid form which acts as a cross-linking agent, then heating to a temperature above 70° C. to form the animal feed.

9. An animal feed produced according to the method of claim 8.

* * * * *